US006197231B1

(12) United States Patent
Lisec

(10) Patent No.: US 6,197,231 B1

(45) Date of Patent: Mar. 6, 2001

(54) PROCESS FOR FILLING THE EDGE JOINTS OF INSULATING GLASS PANELS

(76) Inventor: Peter Lisec, Bahnhofstrasse 34, A-3363 Amstetten-Hausmening (AT)

( * ) Notice: Subject to any disclaimer, the term of this patent is extended or adjusted under 35 U.S.C. 154(b) by 0 days.

(21) Appl. No.: 09/172,082

(22) Filed: Oct. 14, 1998

(30) Foreign Application Priority Data

Oct. 15, 1997 (AT) .................................................. 1747/97

(51) Int. Cl.[7] .................................................. B29C 47/02

(52) U.S. Cl. ...................... 264/40.1; 264/40.5; 264/40.7; 264/252; 264/261; 264/263; 425/135; 425/141; 425/150; 156/109

(58) Field of Search ................................ 264/40.1, 40.5, 264/40.7, 261, 263, 252, 279; 425/113, 135, 141, 150; 156/109, 107, 356

(56) References Cited

U.S. PATENT DOCUMENTS

| | | | |
|---|---|---|---|
| 4,234,372 | 11/1980 | Bernhard et al. | 156/356 |
| 4,973,436 | 11/1990 | Lisec | 264/40.1 |
| 5,136,974 | 8/1992 | Lisec | 118/673 |
| 5,167,756 | * 12/1992 | Lenhardt | 156/578 |
| 5,319,186 | * 6/1994 | Lenhardt | 250/202 |
| 5,335,012 | * 8/1994 | Lisec | 348/92 |
| 5,876,554 | * 3/1999 | Lafond | 156/500 |
| 5,961,759 | * 10/1999 | Schubert | 156/109 |

FOREIGN PATENT DOCUMENTS

| | | |
|---|---|---|
| 28 16 437 | 8/1979 | (DE) . |
| 28 34 902 | 2/1980 | (DE) . |
| 40 09 441 | 10/1990 | (DE) . |
| 44 37 214 | 5/1996 | (DE) . |

* cited by examiner

*Primary Examiner*—Jan H. Silbaugh
*Assistant Examiner*—Mark Eashoo
(74) *Attorney, Agent, or Firm*—Young & Thompson

(57) ABSTRACT

When sealing an insulating glass pane (51) with at least one corner in which the edges (60) of the glass panes of the insulating glass pane (51), i.e. the edges which lead to the corner, include with one another an angle, for example a right, obtuse or acute angle, the sealing nozzle (4) is moved without stopping in one pass around the corner (61) and as the sealing nozzle (4) moves around the corner the emergence of the sealing mass from the sealing nozzle (4) into the edge joint is not interrupted. When travelling around one corner (61) the path (79) of movement of the axis which is aligned perpendicular to the plane of the insulating glass pane (51) to be sealed and around which the sealing nozzle (4) can turn is guided such that it deviates from the outside contour of the insulating glass pane (51). For sealing nozzles (4) which are guided to slide externally along the edges (60) of the glass panes of the insulating glass pane (51), i.e. the edges which border the edge joint, the path (79) of movement is selected such that in the area of corner (61) it runs away from the outside contour of the insulating glass pane (51) to the outside and following corner (61) back again to the edge of the insulating glass pane (51). In the sealing nozzles which dip into the edge joint to be sealed, the path of the axis is chosen such that it deviates in the area of the corner (61) from the outside contour of the insulating glass pane (51) to the inside in the shape of an arc.

10 Claims, 4 Drawing Sheets

PROCESS FOR FILLING THE EDGE JOINTS OF INSULATING GLASS PANELS

Figure 1:
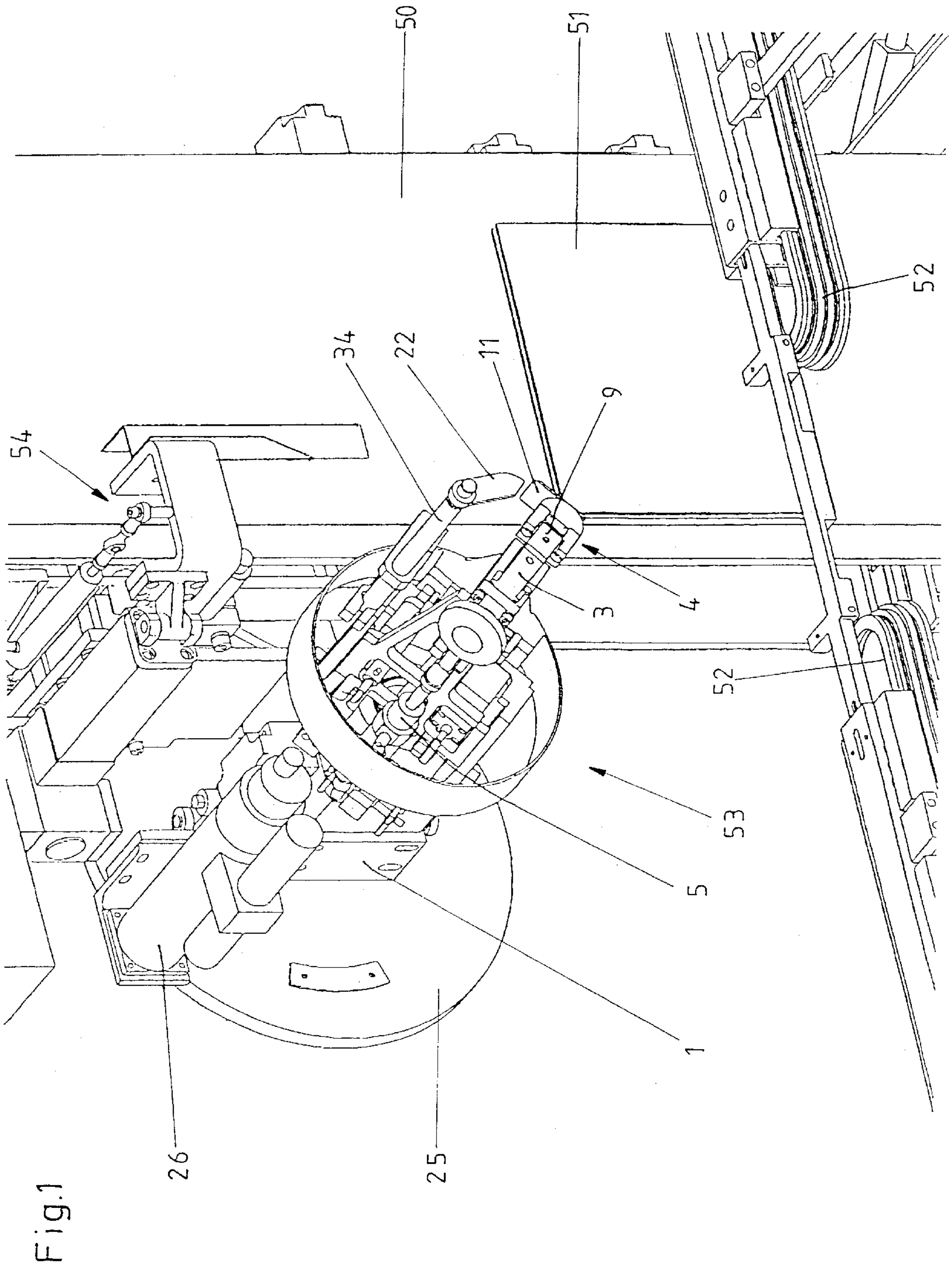

The invention relates to a process claim 1 and a device, especially for claim 15.

When the edge joints of insulating glass panes are filled with sealing masses, especially the corners of the insulating glass panes are a problem since the sealing nozzle, when it arrives at a corner, usually travels beyond it, the emergence of the sealing mass from the sealing nozzle having to be interrupted. The sealing nozzle is then swivelled around an axis perpendicular to the plane of the insulating glass pane (for rectangular panes by 90 degrees) and then attached again to the edge of the insulating glass pane in the area of the corner, whereupon supply of the sealing mass is started again and the sealing nozzle is caused to continue to move along the edge of the insulating glass pane. In doing so on the one hand problems arise with exact proportioning of the sealing mass both upon ending and in restart of sealing so that in the corner area often either too much or too little sealing mass is introduced into the edge joint of the insulating glass pane. Furthermore, it is a disadvantage when the feed of sealing mass is interrupted since in the corner area this can lead to leaky sites or faults in the sealing.

Therefore the object of the invention is to devise a process and a device with which these defects can be avoided.

This object is achieved by a process with the features of claim 1.

In the process as claimed in the invention neither feed of the sealing mass nor movement of the sealing nozzle nor movement of its axis which is aligned perpendicularly to the insulating glass pane is interrupted. The sealing nozzle therefore moves around the corner of the insulating glass pane, emergence of sealing mass from the sealing nozzle not being interrupted, so that on the one hand it is possible to work more quickly and on the other hand the aforementioned faulty sites in the seal cannot arise. Furthermore, proportioning inaccuracies which can occur especially upon interruption and restart of emergence of the sealing mass from the sealing nozzle are reliably prevented so that accurate filling of the edge joint can also be done in the corner area of the insulating glass pane.

This can preferably be further improved by acquiring the depth of the edge joint in the direction of motion in front of the sealing nozzle and by the volume of the edge joint in the corner area being computed based on the depth of the edge joint acquired before and after the corner area and during motion of the sealing nozzle around one corner of an insulating glass pane a corresponding amount of sealing mass being supplied. In this version of the process as claimed in the invention the required amount of sealing mass is accurately acquired and the feed of sealing mass can accordingly be more accurately controlled.

The path along which the axis of the sealing nozzle moves in the area of one corner of an insulating glass pane is preferably essentially arc-shaped, the path of motion for sealing nozzles which dip into the edge joint of the insulating glass pane running preferably within the outside edge of the insulating glass pane. For sealing nozzles which slide on the edges of the two glass panes which border the edge joints, preferably a path of motion of the axis of the sealing nozzle is chosen which in the area of one corner of an insulating glass pane is located outside the outside edge of the insulating glass pane. In both cases the sealing nozzle is elastically held adjacent to the edge of the insulating glass pane.

Also in the corner area, when the sealing nozzle therefore moves around one corner of the insulating glass pane without stopping, the relative speed between the sealing nozzle and the insulating glass pane and the current delivery amount of sealing mass are controlled (changed) such as is known from U.S. Pat. No. 4,973,435 A and U.S. Pat. No. 5,136,974 A in order to achieve the desired degree of filling of the edge joint with sealing mass.

As likewise known from the named documents, relative motion between the sealing nozzle and insulating glass pane is achieved by moving the sealing nozzle along the stationary insulating glass pane and/or by moving the insulating glass pane with the sealing nozzle stationary.

The process as claimed in the invention is as well suited for an automatic single nozzle sealing device as for automatic sealing devices with two or more sealing nozzles.

Since the path along which the axis moves in one embodiment runs within the insulating glass pane and thus the corner is essentially "cut off" and in another embodiment is located outside the peripheral contour of the insulating glass pane, therefore for example moves along a path which is loop-shaped in the area of the corner, conversely the sealing nozzle must move completely around the corner, the distance between the sealing nozzle and the axis becomes increasingly larger or smaller towards the corner and larger or smaller again following the corner until the sealing nozzle is flush A- again with the axis. This motion of the sealing nozzle relative to the axis can for example take place against the force of a spring. Alternatively it can also be provided that this relative motion takes place controlled by a process computer which for example uses as the control parameter the contact pressure between the sealing nozzle and the edge of the insulating glass pane or when the sealing nozzle dips between it and the spacer (frame) and increases the relative distance as the pressure rises, i.e. when the sealing nozzle moves towards the corner, and when the pressure decreases, i.e. when the sealing nozzle moves away from the corner, reduces the relative distance. Geometrical data of the insulating glass pane stored anyway can be used for this control.

Also described is a device for achieving the initially mentioned object which is especially suitable for executing the process.

Preferred and advantageous embodiments of the process and the device as claimed in the invention are the subject matter of the subclaims.

Other details, advantages and features of the process and the device as claimed in the invention follow from the following description of the embodiment of the invention shown in the drawings.

Figure 2:
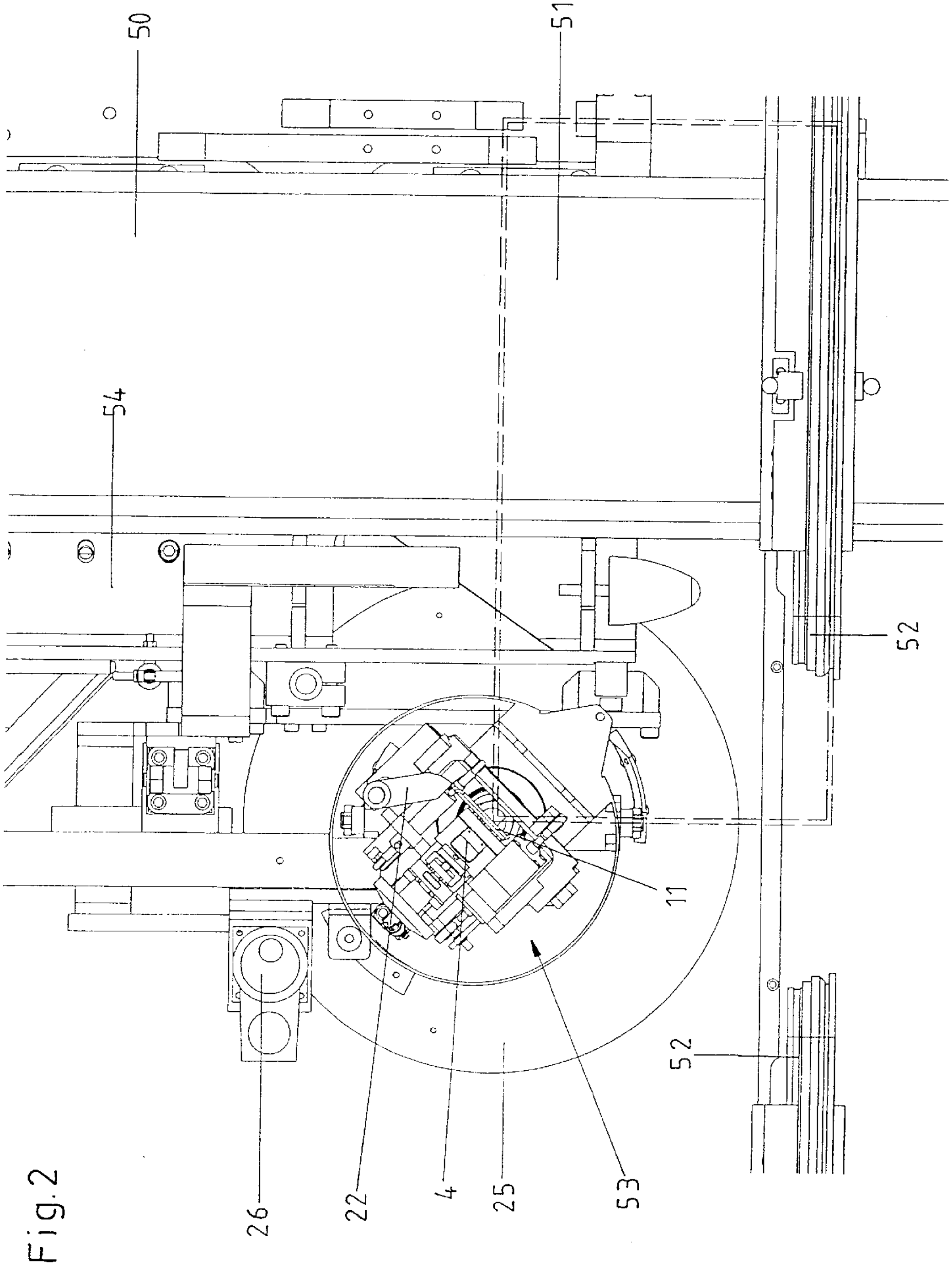
Figure 3:
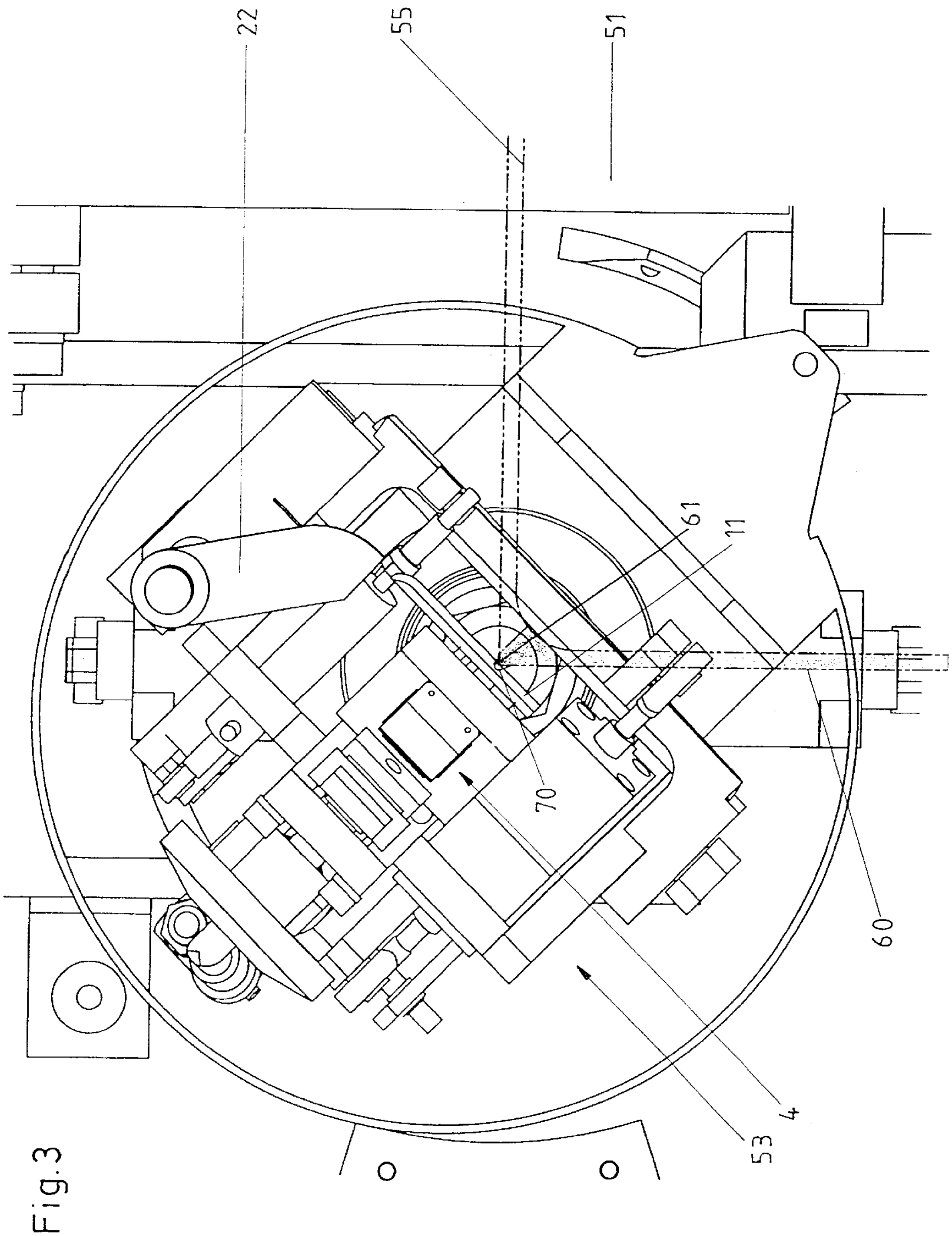
Figure 4:
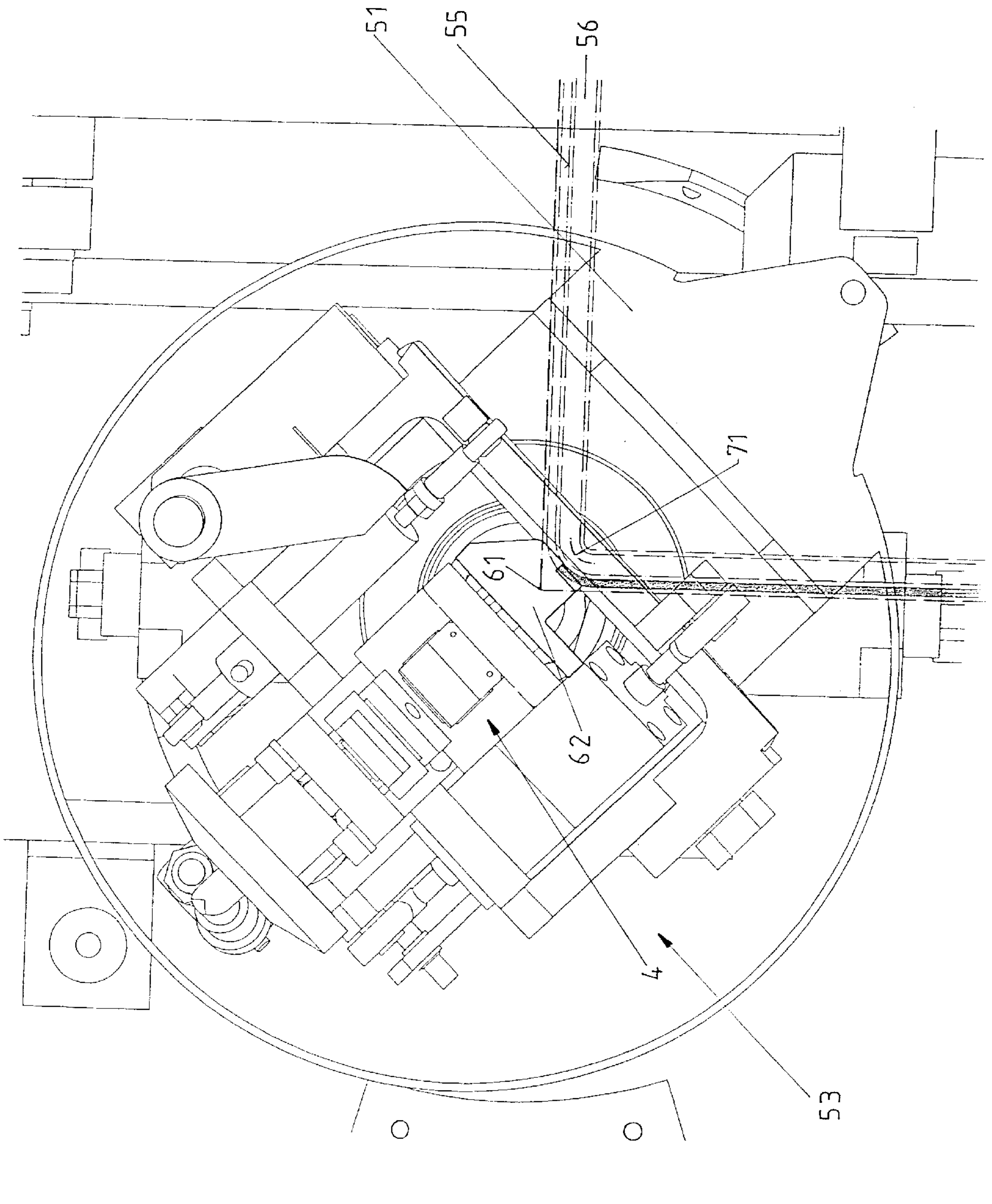

FIG. 1 shows in an oblique view a nozzle head and partially a sealing device, FIG. 2 shows the nozzle head viewed from the front, FIGS. 3 and 4 show examples for paths of motion when travelling around one corner of the insulating glass pane.

A sealing device (automatic sealer) which can be used in the execution of the process as claimed in the invention conventionally has a support surface 50 for lateral support of the insulating glass pane 51 to be sealed which is likewise known, sloped a few degrees to the rear and which can be made as the wall of an air cushion or a roller wall. On the bottom edge of the side support there are conveyor devices 52 for transport of the insulating glass pane 51 into and out of the sealing device, which conveyor devices 52 also cause movements of the insulating glass pane 51 during actual sealing. One especially advantageous embodiment of a side support of a sealing device and of a conveyor device for the insulating glass pane is shown and described in U.S. Pat. No.

44,22,541 A. Furthermore, in the sealing device there can be an auxiliary conveyor which for example using a suction head engages the surface of the insulating glass pane 51 facing away from the support wall 50, especially a small insulating glass pane 51, and which supports exact motion of the insulating glass pane 51 during the sealing process.

A nozzle head 53 can move up and down via a holder 54 on a roughly vertical guide rail which is aligned vertically and parallel to the support wall 50 parallel to the plane of the insulating glass pane 51 and is mounted to turn around an axis which is perpendicular to the plane of the insulating glass pane 51. This is also known from U.S. Pat. No. 5,136,974 A.

The guide rail for the holder of the nozzle head can be located in front of or behind the support wall 50.

The process as claimed in the invention is not limited to automatic sealers in which the insulating glass pane 51 is essentially vertical during sealing, but it can also be used on automatic horizontal sealers in which insulating glass pane 51 lies horizontally on a table.

The nozzle head 53 consists of a carrier 1 which is attached to the holder 54 which is guided essentially vertically to move up and down on the guide of automatic sealers.

On the carrier 1 an arm 3 which bears on its free end the sealing nozzle 4 is mounted to swivel around an axis which is aligned parallel to the plane of the insulating glass pane 51. The arm 3 which bears the sealing nozzle 4 can be swivelled using a pneumatic cylinder 5 so that the sealing nozzle 4 can be elastically placed on the edge of the insulating glass pane 51 to be sealed and can be raised again therefrom.

The carrier 1 is attached to the holder 54 to be able to turn around an axis normal to the plane of the insulating glass pane 51.

The surface of the nozzle plate 11 facing the insulating glass pane 51 touches this axis in the area of the nozzle opening.

On carrier 1 furthermore a stripper plate can be attached which can be moved forward and back using a pneumatic cylinder perpendicular to the plane of the insulating glass pane 51. To move the plate transversely to its plane there is another cylinder with a piston which bears the cylinder.

The sealing nozzle 4 is fixed on the front end of the arm 3 for example using an attachment device which has a leaf spring 9. The sealing nozzle 4 is for example a crowned nozzle, i.e. the nozzle plate 11 is convexly arched on its side facing the insulating glass pane 51.

On the nozzle head 53 there is a depth feeler 22 over an auxiliary frame 34 which is supported on the carrier 1 to swivel around the axis parallel to the swivel axis of arm 3 for the sealing nozzle 4. To swivel the auxiliary frame 20 there is a pneumatic cylinder.

The depth feeler 22 on the auxiliary frame 34 can swivel around an axis parallel to the swivel axis of the arm 3 which bears the sealing nozzle 4. The swivel position of the depth feeler 22 relative to the auxiliary frame 34 is acquired using a ruler. The depth feeler 22 can be convexly curved on its edge facing the insulating glass pane 6.

Using a ruler which is assigned to the depth feeler 22, the deflection of the depth feeler 22 is acquired so that the depth of the edge joint of the insulating glass pane 51 to be sealed can be measured. Depending on the depth of the edge joint, the speed of relative motion between the insulating glass pane 51 and the sealing nozzle 4 and/or the amount of sealing mass which is pressed out of the sealing nozzle 4 into the edge joint is controlled.

Relative motion between the sealing nozzle 4 and the insulating glass pane 51 is executed by the up and down motion of the carrier 1 for the sealing nozzle 4, turning of the latter around the axis perpendicular to the insulating glass pane 51 and/or motion of the insulating glass pane 51 itself.

Swivelling of the sealing nozzle 4 around the axis aligned perpendicularly to the insulating glass pane 6 is executed using a crown gear 25 which is joined to the nozzle head 53 and into which the pinion of a drive motor 26 fits.

The embodiment of a sealing device, especially of the nozzle head 53, described above using FIGS. 1 and 2, should be understood as simply one example for a device suitable for executing the process as claimed in the invention.

For example, the depth feeler 22, instead of being mounted on a swivelling arm on the nozzle head 53, can be turned around an axis normal to the plane of the insulating glass pane 51 in order to acquire the depth of the edge joint.

To acquire the depth of the edge joint of the insulating glass pane 51, therefore the distance between the outside surface of the spacer frame and the outside edges of the two glass panes of the insulating glass pane 51, there can also be other devices, for example, sensors, which are preferably located on the nozzle head 53.

FIG. 3 shows how the path runs along which the axis of rotation moves around which the sealing nozzle 4 is supported to turn on its holder 54 when travelling around one corner 61 of the insulating glass pane 51 for the case of a crowned sealing nozzle 4 with a nozzle plate 11 which is moved adjacent to the inside edges of the two glass panes of the insulating glass pane 51. In the area of the edges 60 of the two glass panes, that is, the edges which lead to the corner 61, the nozzle head 53 is aligned such that its swivel axis is moved essentially in a path which coincides with the edges 60. In the area of the corner 61 itself the nozzle head 53 is moved such that the path 79 of motion in the area of the corner 61 runs outside the insulating glass pane 51 and is roughly loop-shaped, as shown in FIG. 3. In this way and due to the described resilient support of the nozzle 4 on the nozzle head 53 the forces of friction between the nozzle plate 11 and the edges 60 of the two glass panes of the insulating glass pane 51 are reduced to such an extent that not only sealing nozzle 4 can be swivelled easily around the corner without being stopped. In addition, the forces of friction between the nozzle plate 11 and the insulating glass pane 51 are reduced such that premature wear of the nozzle plate 11 is prevented.

When the nozzle head 53 is provided with a nozzle 4 which bears a component 62 which carries the nozzle mouth and which dips into the edge joint between the two glass panes of the insulating glass pane 51 and slides along the outside surface 55 of the spacer 56, when travelling around a corner 51 of the insulating glass pane 51, the path 71 of movement for the axis of rotation around which the nozzle head 53 is supported to move on its carrier is selected such that it lies in the area of the corner 61 within the outside contour of the insulating glass pane 51. The path 71 of movement is shown in FIG. 4 by the dot-dash line.

Both in the version of the process as claimed in the invention shown in FIG. 3 and also in FIG. 4, the emergence of the sealing mass from the sealing nozzle 4 is interrupted in the area of one corner as little as the motion of the sealing nozzle 4 around the corner 61 of the insulating glass pane 51.

The process as claimed in the invention and the device as claimed in the invention are intended for sealing of insulating glass panes 51 which have at least one corner 61 on which the edges 60 of the two glass panes of the insulating glass pane 51, i.e. the edges which lead to the corner 61, include with one another an angle, for example a right, obtuse or acute angle.

In summary one embodiment of the invention can be described as follows.

When sealing an insulating glass pane 51 with at least one corner in which the edges 60 of the glass panes of the insulating glass pane 51, i.e. the edges which lead to the corner, include with one another an angle, for example a right, obtuse or acute angle, the sealing nozzle 4 is moved without stopping in one pass around the corner 61 and as the sealing nozzle 4 moves around the corner the emergence of the sealing mass from the sealing nozzle 4 into the edge joint is not interrupted. When travelling around one corner 61 the path 79 of movement of the axis which is aligned perpendicular to the plane of the insulating glass pane 51 to be sealed and around which the sealing nozzle 4 can turn is guided such that it deviates from the outside contour of the insulating glass pane 51. For sealing nozzles 4 which are guided to slide externally along the edges 60 of the glass panes of the insulating glass pane 51, i.e. the edges which border the edge joint, the path 79 of movement is selected such that in the area of corner 61 it runs away from the outside contour of the insulating glass pane 51 to the outside and following corner 61 back again to the edge of the insulating glass pane 51. In the sealing nozzles which dip into the edge joint to be sealed, the path of the axis is chosen such that it deviates in the area of the corner 61 from the outside contour of the insulating glass pane 51 to the inside in the shape of an arc.

What is claimed is:

1. Process for sealing of an insulating glass pane in which a sealing mass is injected into an edge joint of the insulation glass pane from a sealing nozzle moved relative to the insulating glass pane, wherein while the sealing nozzle is moved around one corner of the insulating glass panes, the sealing nozzle is turned around an axis perpendicular to a plane of the insulating glass pane as the sealing mass is continuously injected into the edge joint of the insulating glass pane;

wherein the axis around which the sealing nozzle is turned is moved in an area of the corner of the insulating glass pane along a path which deviates from an outside contour of the insulating glass pane, and wherein the path runs in the area of the corner of the insulating glass pane along an arc which lies within the insulating glass pane.

2. Process as claimed in claim 1, wherein the path of the axis has essentially the shape of a circular arc.

3. Process as claimed in claim 1, wherein the path runs in the area in front of and following the corner on the edge of the insulating glass pane.

4. Process as claimed in claim 1, wherein the depth of the edge joint is acquired in the direction of movement in front of the sealing nozzle.

5. Process as claimed in claim 4, wherein the volume of the edge joint in the area of one corner is computed based on the depth of the edge joint acquired before and after the corner area and during motion of the sealing nozzle around the corner an amount of sealing mass corresponding to the acquired depth of the edge joint is injected into the latter.

6. Process as claimed in claim 4, wherein the outside radius of curvature of the spacer frame is considered in the computation of volume for a spacer frame curved in the corner area.

7. Process as claimed in claim 1, wherein the delivery of sealing mass emerging from the sealing nozzle is controlled as adapted to the relative speed between the sealing nozzle and the insulating glass pane as well as the volume of the edge joint.

8. Process as claimed in claim 1, wherein the amount of sealing mass pressed out of the sealing nozzle per unit of time is acquired and wherein the amount delivered is controlled depending on the relative speed between the sealing nozzle and the insulating glass pane and the volume of the edge joint.

9. Process as claimed in claim 1, wherein the amount of sealing mass pressed out of the sealing nozzle per unit of time is acquired and wherein the relative speed between the sealing nozzle and the insulating glass pane is controlled according to the acquired amount of sealing mass and the volume of the edge joint.

10. Process for sealing of an insulating glass pane in which a sealing mass is injected into an edge joint of the insulation glass pane from a sealing nozzle moved relative to the insulating glass pane, wherein while the sealing nozzle is moved around one corner of the insulating glass pane, the sealing nozzle is turned around an axis perpendicular to the plane of the insulating glass pane as the sealing mass is continuously injected into the edge joint of the insulating glass pane;

wherein the axis around which the sealing nozzle is turned is moved in an area of the corner of the insulating glass pane along a path which deviates from an outside contour of the insulating glass pane, said path running outside the insulating glass pane in the area of the corner of the insulating glass pane, said path running in the area of the corner from the outside contour of the insulating glass pane in a loop to the outside away from the edge of the insulating glass pane and back again to the edge of the insulating glass pane.

* * * * *